US008745178B2

(12) United States Patent  
Kinnis

(10) Patent No.: US 8,745,178 B2  
(45) Date of Patent: *Jun. 3, 2014

(54) SELECTION OF AN APPROPRIATE ONLINE CONTENT SOURCE BASED ON PROGRAM INFORMATION

(71) Applicant: Apple Inc., Cupertino, CA (US)

(72) Inventor: Tony F. Kinnis, San Jose, CA (US)

(73) Assignee: Apple Inc., Curpertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/689,085

(22) Filed: Nov. 29, 2012

(65) Prior Publication Data

US 2013/0091256 A1  Apr. 11, 2013

Related U.S. Application Data

(63) Continuation of application No. 12/321,970, filed on Jan. 26, 2009, now Pat. No. 8,346,901.

(51) Int. Cl.
 *G06F 15/177* (2006.01)
(52) U.S. Cl.
 USPC .......................................................... 709/220
(58) Field of Classification Search
 USPC .................................................. 709/220–222
 See application file for complete search history.

(56) References Cited

U.S. PATENT DOCUMENTS

| 6,275,934 | B1 * | 8/2001 | Novicov et al. ............... 713/168 |
| 6,748,386 | B1 | 6/2004 | Li | |
| 7,454,479 | B2 | 11/2008 | Alexander et al. | |
| 2004/0133630 | A1 | 7/2004 | Coles et al. .................... 709/202 |
| 2006/0106806 | A1 | 5/2006 | Sperling et al. ................ 707/10 |
| 2007/0288591 | A1 | 12/2007 | Wong et al. .................... 709/217 |
| 2008/0005733 | A1 * | 1/2008 | Ramachandran et al. .... 717/168 |
| 2008/0140542 | A1 | 6/2008 | Perron | |
| 2008/0194293 | A1 | 8/2008 | Jessup et al. ............... 455/556.2 |
| 2008/0294796 | A1 | 11/2008 | Lee et al. ....................... 709/245 |
| 2009/0055472 | A1 | 2/2009 | Fukuda ......................... 709/203 |
| 2009/0094638 | A1 | 4/2009 | Brier et al. ....................... 725/34 |
| 2009/0228281 | A1 | 9/2009 | Singleton et al. ............. 704/275 |
| 2009/0228376 | A1 | 9/2009 | Rollins et al. ................... 705/30 |
| 2010/0088367 | A1 * | 4/2010 | Brown et al. .................. 709/203 |
| 2010/0122351 | A1 | 5/2010 | Lloyd et al. ..................... 726/29 |
| 2011/0055073 | A1 | 3/2011 | Rosko ............................. 705/38 |

FOREIGN PATENT DOCUMENTS

EP  0889418 A2  1/1999

* cited by examiner

*Primary Examiner* — Jason Recek  
(74) *Attorney, Agent, or Firm* — Novak Druce Connolly Bove + Quigg LLP

(57) ABSTRACT

Methods and arrangements for selecting a content source from a plurality of potential content sources based on program information are described. A network resource maintains a mapping between itself and a static URL to be accessed by an application when updating content used in the application. The network resource can receive, over an electronic network, a configuration request providing the static URL and program information that at least identifies the application and version of the application. Based on the received information that is specific to the identified application version and from which content specific for that application version can be obtained, the network resource determines a second URL and provides the second URL to the application in response to the request.

21 Claims, 5 Drawing Sheets

SELECTION OF AN APPROPRIATE ONLINE CONTENT SOURCE BASED ON PROGRAM INFORMATION

CROSS-REFERENCE TO RELATED APPLICATIONS

The present continuation application claims priority to non-provisional U.S. patent application Ser. No. 12/321,970 titled "Selection of an Appropriate Online Content Source Based on Program Information," filed Jan. 26, 2009, the disclosure of which is expressly incorporated therein by reference in its entirety.

TECHNICAL FIELD

The present disclosure relates to retrieving online content for use with applications and in particular to selecting a content source for an application from a plurality of potential content sources.

INTRODUCTION

Increasingly, more and more applications utilize online content to enhance and update application features. Typically, the application will come with instructions on how to locate a particular network resource or the application will ask the user to choose from a list of network resources at install. However, these methods have the drawback that internet content changes rapidly. Not only does the content itself change, but also the location of the network resources.

Another problem with providing an application with the location of a network resource comes with mass-distributed programs that utilize online content. It is frequently the case that a program is developed for distribution in many different locations such as different countries, or computing environments such as different operating systems or different operating system configurations. In these cases it is often desired that the user experience differs based on location or computing environments. In some cases, a publisher of online content may not have permission to distribute content to all regions and thus multiple content sources might be needed. In such cases the mass-distributed program ordinarily needs to know the URLs to all of the different online content locations that any user might possibly end up visiting. In order to provide the locations of the network resources either different editions of the application must be created and distributed to users requiring different locations or the application must know the location of every possible resource. This is both tedious and wasteful. Additionally, should the location of the content change, the application would need to be updated which is also not desirable. From an application publisher's point of view, it is hard to make all users download and install the appropriate updates and ensure that the application continues to function properly.

Accordingly, there is a need for a resource that can determine the appropriate content source for an application without risk that the resource changes location or content. Similarly, there is a need for a resource that can determine the appropriate content based on geographic considerations and system preferences for an application and direct the application to the same.

SUMMARY

Additional features and advantages of the concepts disclosed herein are set forth in the description which follows, and in part will be obvious from the description, or may be learned by practice of the described technologies. The features and advantages of the concepts may be realized and obtained by means of the instruments and combinations particularly pointed out in the appended claims. These and other features of the described technologies will become more fully apparent from the following description and appended claims, or may be learned by the practice of the disclosed concepts as set forth herein.

The present disclosure describes methods and arrangements for selecting a content source for an application from a plurality of potential content sources. A network resource hosts a configuration module for the application and maintains a mapping between itself and a static URL to be accessed by an application when updating content used in the application. The application can access the network resource over an electronic network. Likewise, the network resource can receive, over the electronic network, a configuration request providing the static URL. The network resource can also receive program information that at least identifies the application and version of the application. In some embodiments the configuration request and the program information are part of the same transmission of information. In still yet other embodiments, the configuration request and the program information are received by providing the same URL having a static portion and an appended variable portion. The static portion includes the address of the network resource and the appended variable portion contains program information that at least identifies the application and version of the application.

Based on the received information that is specific to the identified application version and from which content specific for that application version can be obtained, the network resource determines a second URL and provides the second URL to the application in response to the request.

Also disclosed is a computer-readable medium having a computer-readable program code for selecting a content source for an application from a plurality of potential content sources. The computer-readable medium instructs a network resource to maintain a mapping between the network resource and a static URL to be accessed by an application when updating, over an electronic network, content used in the application. Further the code on the computer-readable medium instructs the network resource to receive a configuration request providing the static URL and also to receive program information that at least identifies the application and version of the application. Further the code on the computer-readable medium instructs the network resource to determine a second URL based on the received information that is specific to the identified application version and from which content specific for that application version can be obtained, and to provide the second URL to the application in response to the request.

Additionally, a computer-readable medium having a computer-readable program code containing a mass-distributed program which utilizes internet content from a source that can be dynamic in location and content is disclosed. The computer-readable medium comprising code causes a computer to direct a communication interface to access a configuration module found at an constant URL over a communications network and to send to the configuration module program information to be used in determining the source of internet content specific to the program version, wherein the program information is appended to the unchanging URL. Further the code causes the computer to receive from the configuration module a second URL that hosts the internet content specific to the program version; and to communicate with a server at the second address, via a communication interface over a communications network, to receive internet content specific to the program version.

BRIEF DESCRIPTION OF THE DRAWINGS

In order to best describe the manner in which the above described embodiments are implemented, as well as define other advantages and features of the disclosure, a more particular description is provided below and is illustrated in the appended drawings. Understanding that these drawings depict only exemplary embodiments of the invention and are not therefore to be considered to be limiting in scope, the examples will be described and explained with additional specificity and detail through the use of the accompanying drawings in which.

DETAILED DESCRIPTION

Various embodiments of the disclosed methods and arrangements are discussed in detail below. While specific implementations are discussed, it should be understood that this is done for illustration purposes only. A person skilled in the relevant art will recognize that other components, configurations, and steps may be used without parting from the spirit and scope of the disclosure.

Figure 1:
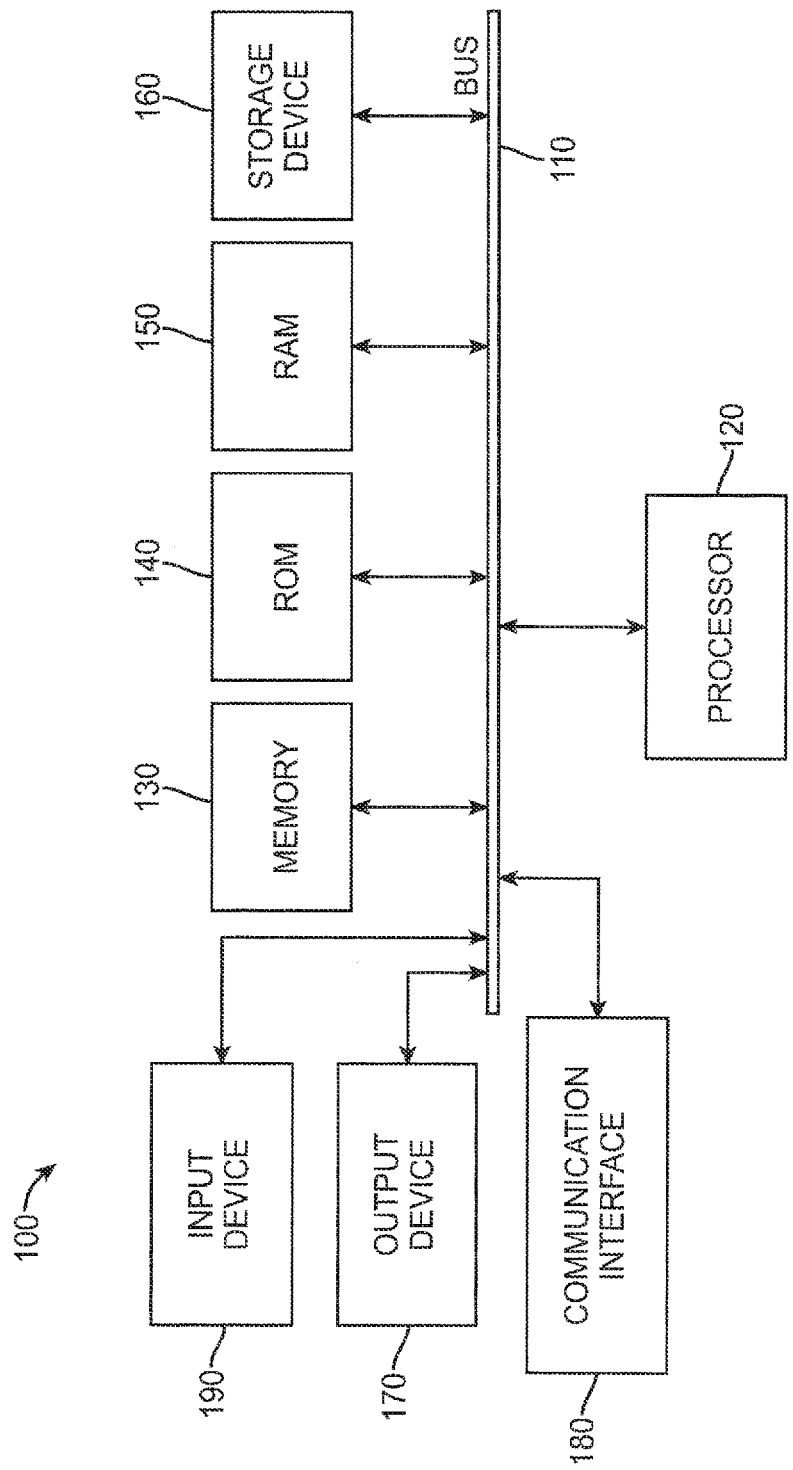
FIG. 1 illustrates an example system embodiment.

With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the system may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. In one aspect, a hardware module that performs a particular function includes the software component stored in a tangible computer-readable medium in connection with the necessary hardware components, such as the CPU, bus, display, and so forth, to carry out the function. The basic components are known to those of skill in the art and appropriate variations are contemplated depending on the type of device, such as whether the device is a small, handheld computing device, a desktop computer, or a large computer server.

Although the exemplary environment described herein employs a hard disk, it should be appreciated by those skilled in the art that other types of computer readable media which can store data that is accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the disclosed methods and devices operating on any particular hardware arrangement and therefore the basic features may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits.

The computing device described above is particularly useful for mass-distributed programs that utilize online content. Specifically, in the case that a program is developed for distribution in many different locations such as different countries, or computing environments, such as different operating systems or different operating system configurations, the user experience can differ based on location or computing environments. This is especially true with applications designed to incorporate online content into the user experience. However, due to a variety of factors, it is frequently the case that the online content that should be available to every user around the world is not the same and thus applications must be able to retrieve the content appropriate for their operating environment. With the present technology, the mass-distributed program needs only to know one URL, which contains the address of a configuration module that can determine the URL or address of the online content intended for the specific location or environment in which the application is running.

In an example embodiment, the application sends pertinent information about the user or the computing environment to the configuration module on a network resource, which is located at a constant URL that will not change in the future. The module returns a result comprising a second URL that is the address of online content to be used by the application.

Any variable that distinguishes one group of users over another can be used by the configuration module to choose the appropriate source of online content. In a preferred embodiment, one such variable might be the location of a user. A user in Germany would need to see online content in German and a user in the United States would need to see online content in English. Thus, the German user and the United States user would each access different online content. Similarly, different computing environments might also require different online content. Older computers or application version might not support the same content and thus different content would be provided to each of user according to their system's capabilities.

This method has several advantages. First, it allows for fewer editions of a particular version of an application to be distributed. Rather than create a different version for every source of online content or for every country that the program will be distributed, fewer versions are necessary because the configuration module will direct the application to the correct content location. Second, the online content location can be changed without fear that an older version will not know where to access the online content. Patches and updates are not needed. The application publisher or content provider can freely make changes to the online content without impacting the function of the application. The application can continue to work seamlessly even after changes to the online content since the configuration module URL is fixed and the module will continue to be available to determine the location of the online content.

Additionally, the configuration module allows a content provider or application publisher to have default content sources as well as specialized content sources. For example, if for a certain sub-group of users, a specific content source does not exist, the configuration module can forward the users to default content sources. Such a scenario is likely for certain regions or countries for which the application published has not created localized content for the user's region.

Figure 3:
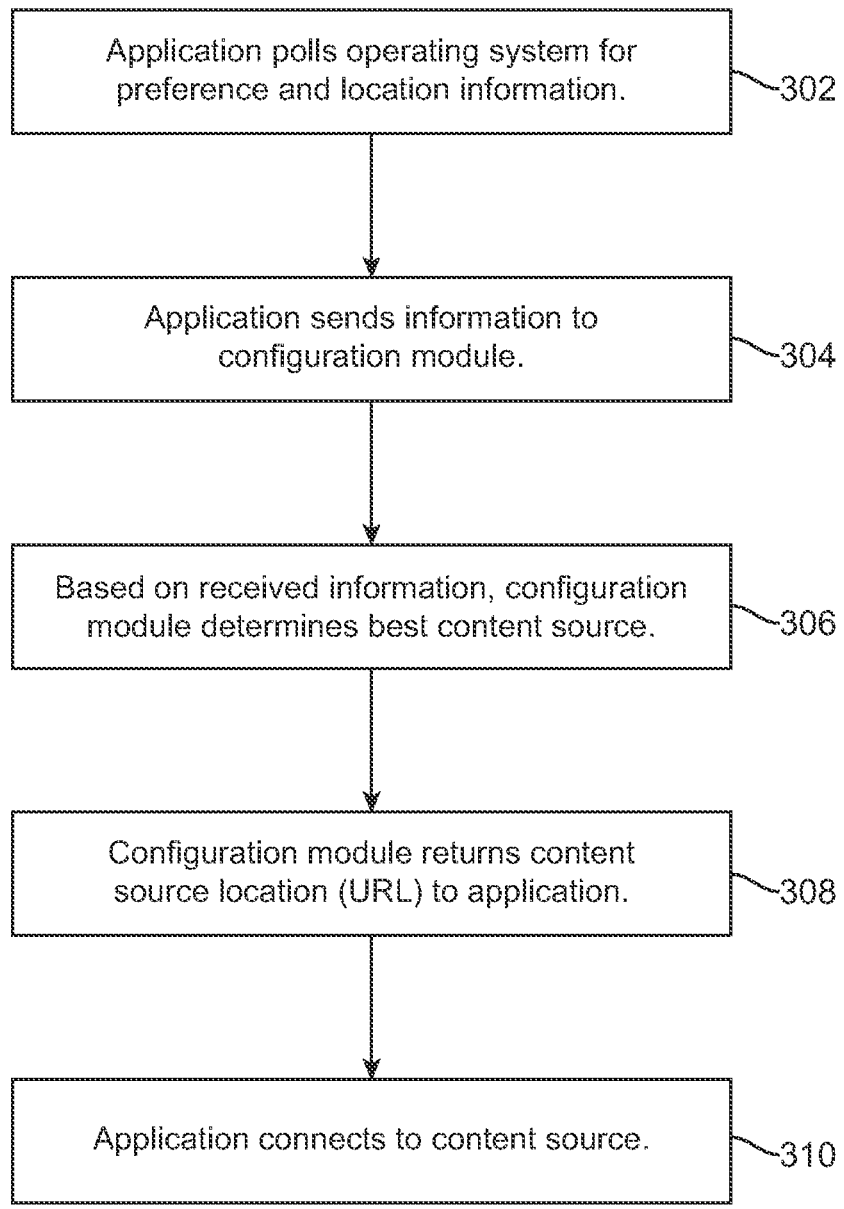
FIG. 3 illustrates an example method embodiment used by the system.

Each application can find the appropriate content source by the method illustrated in FIG. 3. At step 302 the application polls the operating system for information that can be used by the configuration module to determine the appropriate content source. This information can consist of any or all of: operating system type or version, application type or version, geographic location, language preferred, user preferences, I.P. address or any other information the application publisher chooses to have the application send. In an alternative embodiment, the Application may send a request for content location to the configuration module and the configuration module can request certain information required to determine the proper content source.

After the desired information is gathered, the application sends the information to the configuration module at step 304. The transfer of information from the application to the configuration module is via a communication interface over a communications network. Many possibilities are well known to those skilled in the art. Communication protocols too may vary, but in a preferred embodiment the application and configuration module communicate using hyper-text transfer protocol (HTTP).

At step 306, the configuration module determines the appropriate content source for the application. This step can be done in any number of ways. If the content source is chosen based on relatively few parameters a simple table lookup can be sufficient. In other embodiments an algorithm or logic steps might determine the content source from many variables. In still yet other embodiments, multiple variables can be pasted into a template with the results being a potential source of content. If the configuration module verifies the address is valid, that address is returned, but if the address is not valid a default address is returned to the application. Any number of different mechanisms can be used to determine the appropriate content source.

Once the appropriate content source is determined, the configuration module returns the location of the content source to the application in step 308. In one embodiment the configuration module will return the URL of the content source that should be used by the application. In another embodiment, the configuration module can redirect the application to the content source.

In some instances it is desired that the application learn of the content source location for subsequent connections or communication with the content source. Once the application learns of the content source, the application can connect to the content source and load the content in step 310.

It can be desired that the application reconnect to the configuration module on a regular basis to determine if a better content source exists. The regular basis can be any reoccurring time or event such as every year, month, week, day, hour, or even every time the past content source is not available. Thus, the reoccurring event is not limited to temporal events.

The disclosed technology is not limited to determining only an appropriate source of content to be used by the application. In some embodiments the configuration module can also return URLs for the application's use in other functions, such as finding help. The configuration module can also send back information to instruct the application to enable or disable certain features. Any type of information that can be useful in configuring the application can be returned by the configuration module.

Figure 2:
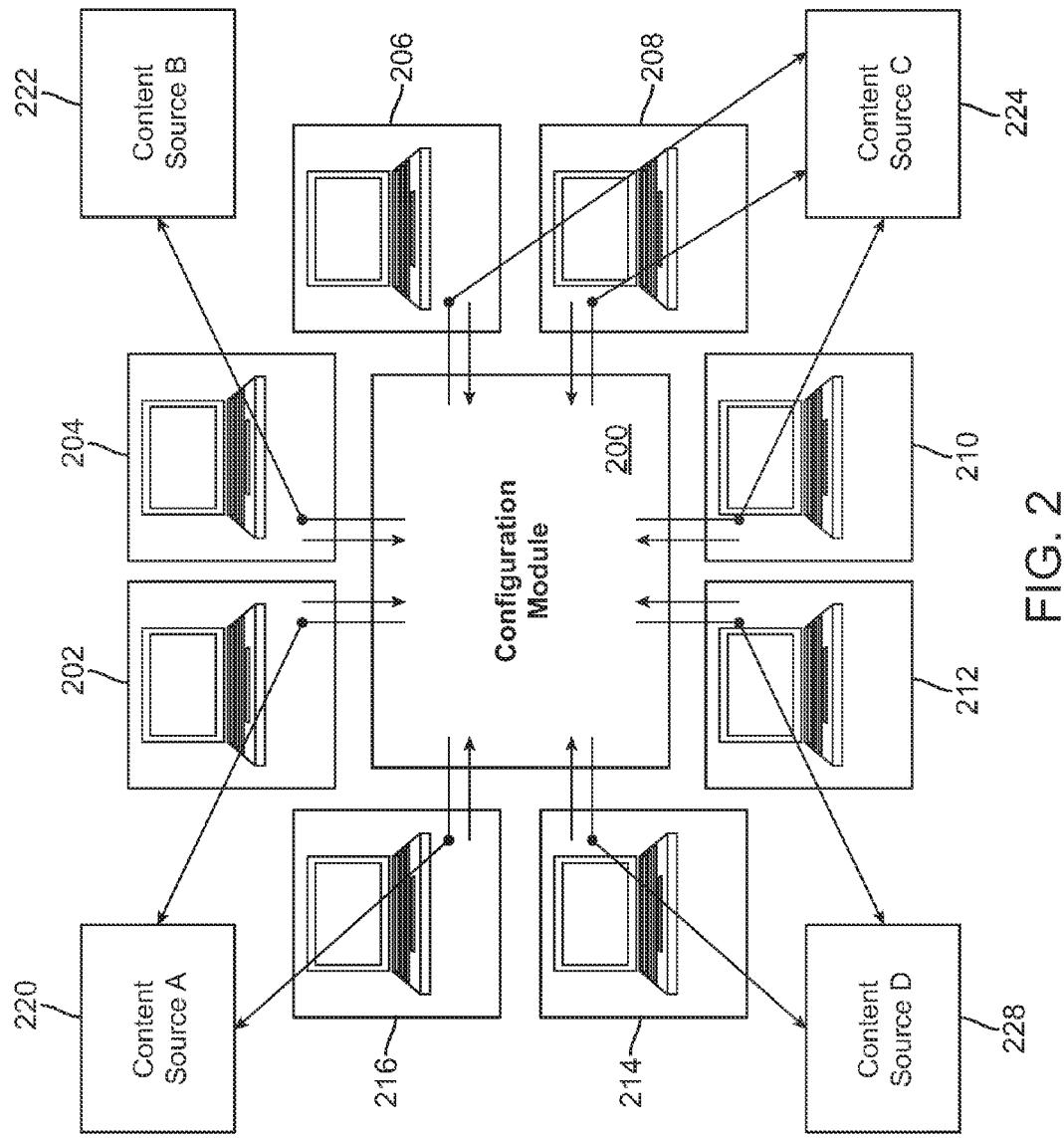
FIG. 2 illustrates an example system embodiment determining an appropriate content source based on language and location.

In FIG. 2, the system implementation of the above described method is illustrated. Eight separate terminals 202, 204, 206, 208, 210, 212, 214, 216 running the same application on terminals of different geographic locations and having different system preferences are illustrated. When each application attempts to connect to the online content source it does so as discussed above. Each application is each distributed either on media or as a download with the URL of the configuration module 200, which will never change.

Now discussing 202, the application can send information about itself and the terminal it is running on to the configuration module 200. Polling, for example, the operating system the application on 202 can determine that it is running in Canada and the operating system's language preference is set to French. The configuration module 200 determines based on these preferences that the appropriate content source is content source A and returns the URL for the same to application on 202. The application then can retrieve content specific to Canadian users in the preferred language, French.

Similarly, the application on 216 is also running on a system that has French set as the preferred language, but terminal 216 is in France. In this example, terminal 216 contacts the same configuration module 200 and the configuration module determines that the appropriate content source is again content source 220. Comparing application on terminal 216 to the application on terminal 202, the configuration module determines that both Canadian users and French users are entitled to the same content material and they both share the same language. The configuration module in this case determines that the appropriate content source is 220.

Compare the applications on terminals 202 and 216, with the applications on terminals 204, 206 and 208. In this example, geographic location necessitates that every user is not entitled to the same content, thus they should not be directed to the same content source. Each application informs the configuration module that they are running on systems that prefer English, but terminal 204 is running in England, while terminals 206 and 208 are running in the United States. Each terminal connects to the same configuration module 200 but this time the configuration module determines that appropriate content source for the application on terminal 204 is content source 222, while the appropriate content source for the applications on terminals 206 and 208 is content source 224.

Compare the applications on terminals 204, 206 and 208 with the application on terminal 210. In this example, despite a difference in language preference, the configuration module determines that there is no other content source that provides content to United States users and thus all applications should get their content from the same source. The application on terminal 210 also runs in the United States just as the applications on terminals 206 and 208, but the language preference for terminal 210 is Spanish. The application sends this information to the configuration module 200 and the module determines that content source 224 is again the appropriate content source despite the difference in language preference.

In some instances, the configuration module 200 cannot find a preferred content source for a particular application. In these cases the application is directed to a default content source. For example, the application on terminal 212 is running in Australia and its language preference is set to English while the application on terminal 214 is running in Russia and its language setting is Russian. The applications on terminals 212 and 214 send this information to the configuration module 200 which returns the same URL to both applications. In this example neither Australia nor Russia have a content source specific for these regions and thus they are directed to the default content source.

Figure 4:
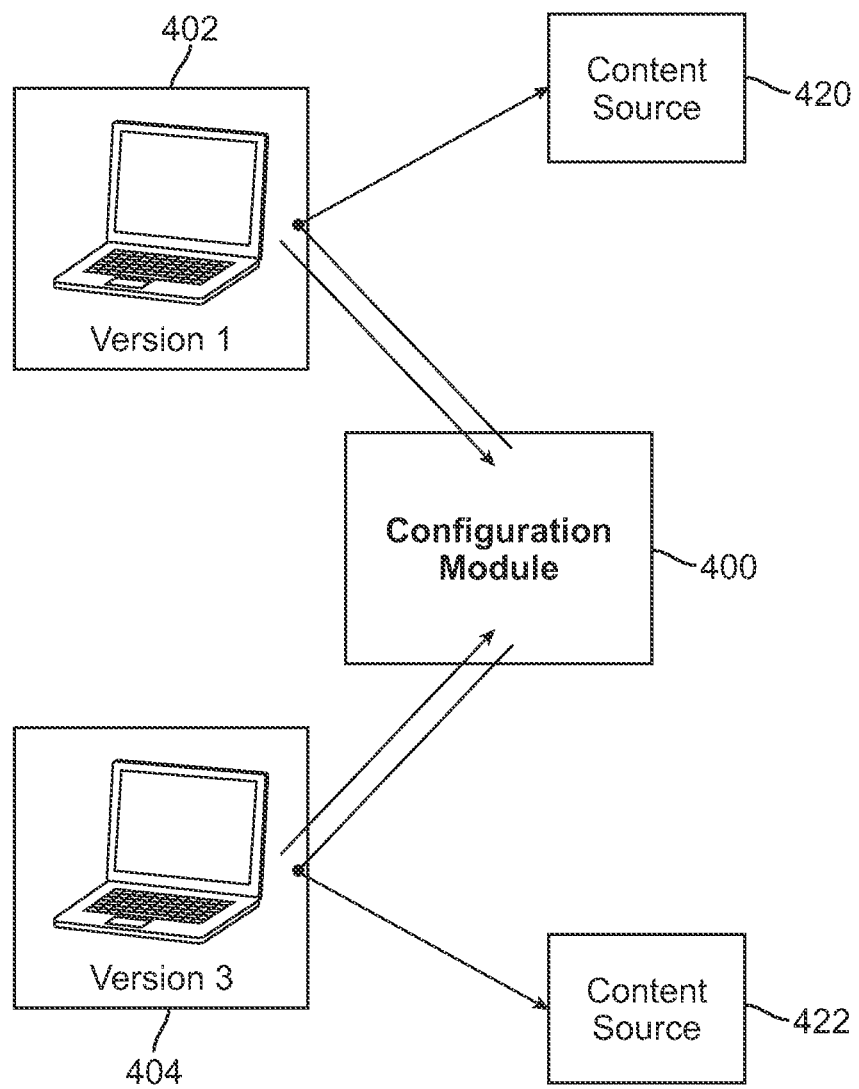
FIG. 4 illustrates an example system embodiment determining an appropriate content source based on version information.

Referring now to FIG. 4, an alternate system function is illustrated. In this figure, application version or application type is part of the information that the configuration module uses to determine the appropriate content source. 402 and 404 are computers running the same application, Application X, except that 402 runs version 1.0 and 404 runs 3.0 of the program. Version 1 of the program has certain functionality, but version 3.0 has additional functionality. In this example 402 and 404 send version information to configuration module 400 and the module determines that 402 should be directed to content source 420, while 404 should be directed to content source 422 which has content that supports the additional features of Application X version 3.0 that are not supported by version 1.0.

As can be appreciated from the discussion of the figures above the configuration module can be used to determine the appropriate content source based on any number or variety of variables. Any information that can be made known to the configuration module can optionally be used to determine the appropriate source of content for that application. The system and method described make it possible to distribute only one edition of a program yet allow for each copy to provide the user with a different experience based on online content chosen based on any number of variables. Variables can include, but are not limited to program type, program version, operating system, operating system version, country, language, content ratings, content in general, user preferences and regional restrictions. Any variable useful to the configuration module can be sent by the application, including global positioning system (GPS) information.

Figure 5:
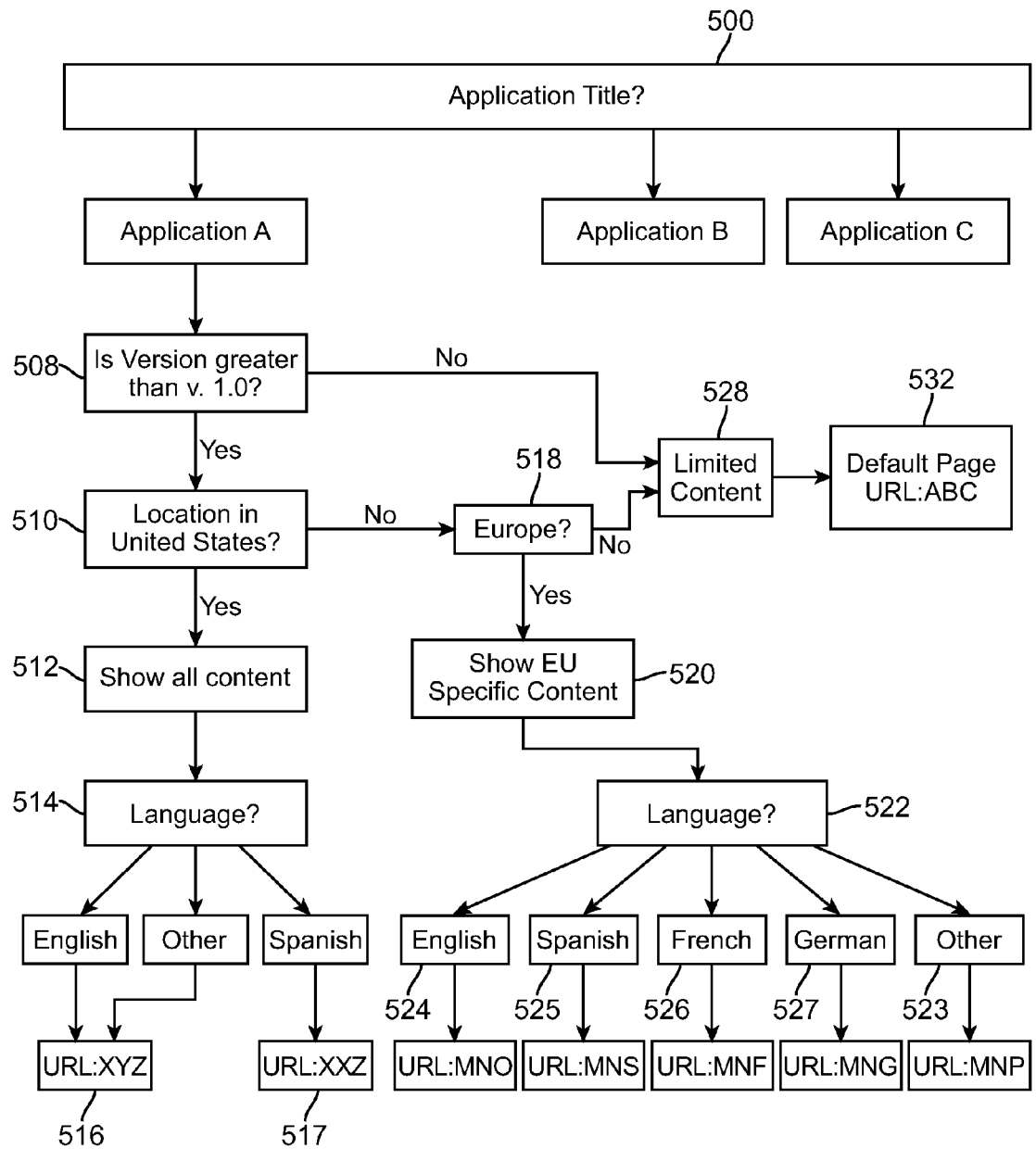
FIG. 5 illustrates and example method embodiment used by a network resource.

In FIG. 5 an example method of determining the appropriate content source used by the configuration module is shown. At step 500, the application title is determined. Each possible application begins its own tree of steps to determine the appropriate content source. For the sake of simplicity applications B and C will not be discussed further, but the steps pertaining to application A can also be viewed as applying to applications B and C. Once application A is determined to be the application seeking content, the configuration module can next determine which version of application A is requesting content. At step 508, the configuration module determines if the version of the application is greater than version 1. In this example, version 1 only supports limited content and thus if the application is version 1 the method will determine that a source that provides only limited content is appropriate in step 528. If the version is greater than version 1, the configuration module determines if the user is in the United States at step 510. If yes, the configuration module determines that a content source showing all content is appropriate at step 512. At step 514 the configuration module determines if the user's language preference is English, Spanish, or some other language. If the language preference is English URL: XYZ is returned at step 516, if Spanish, URL: XXZ is returned at step 517, if some other language the URL for English can be returned.

If in step 510 the configuration module learns that user is in Europe at step 518, the configuration module determines that European Union specific content should be returned at step 520 and determines the appropriate language at step 522. If the language is English URL: MNO is returned at step 524, if Spanish; URL: MNS is returned at step 525, if French, URL: MNF is returned at step 526, if German, URL: MNG is returned at step 527, is some other language, URL: MNF is returned is returned at step 523.

If at step 518 it is determined that the user is not in Europe, the system determines that the user is entitled to limited content only at step 528, which can be the default site for this application. At step 532 URL: ABC, the default content page, is returned to all users not in Europe or the United States and users using version 1.0.

The URL to the configuration module must remain constant over time to provide value to the application. In many cases the application will, at least initially, only know of one URL, the URL of the configuration module. As is apparent from the above discussion the URL can be the URL of a service that determines the content source for many different applications or versions of applications. In other instances the configuration module might be specific to a particular application or even version of the application.

The URL can also be used to transmit information to the configuration module. For example, the system can employ a URL having a static portion and a variable portion wherein the static portion is the location of the configuration module and the variable portion can include the information to be transmitted to the content source. A sample URL might be for example: contentsource.com/contentConfig?app=

ApplicationX&version1.2&language=en&os=Operating-SystemY10.5.5&country=US. In this example the configuration module is located at: contentsource.com/contentConfig? and everything that comes after this is the variable portion. The variable portion is a filled in as a template, which the configuration module will use to determine the appropriate content source. In this example, the application seeking the content source has completed the URL and the configuration module can learn that the application seeking content is Application X version 1.2 running on Operating System Y version 10.5.5 having English set as its language preference and running in the United States. Based on this information the configuration module can determine the appropriate content source for the application.

In some embodiments, the system and method can also be compatible with portable devices such as smart phones. In such situations it can be desirable for the application to send additional information about its environment that the configuration module can use to determine the most appropriate content source. For example, the application might be able to access GPS coordinates using a smartphone GPS capabilities, or network speed by determining what the network the mobile device is connected to. In some cases, the information that a smartphone might send to the configuration module can be replace other information more commonly used. For example, instead of sending country information, GPS information can be substituted.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Communication at various stages of the described system can be performed through a local area network, a token ring network, the Internet, a corporate intranet, 802.11 series wireless signals, fiber-optic network, radio or microwave transmission, telecommunications network etc. Although the underlying communication technology may change, the fundamental principles described herein are still applicable.

The various embodiments described above are provided by way of illustration only and should not be construed to limit the invention. For example, the principles herein may be applied to a distributed application which required connection to a website for program content that is frequently changing. The principles herein are equally applied to any program or even multiple different programs sharing the same configuration module. Those skilled in the art will readily recognize various modifications and changes that may be made to the present invention without following the example embodiments and applications illustrated and described herein, and without departing from the true spirit and scope of the present disclosure.

The invention claimed is:

1. A computer program product being embodied in a non-transitory computer-readable medium and comprising computer instructions for:
   receiving, at a network resource from an electronic device, a configuration request for a content source that contains political region-specific content specific for an application on the electronic device, the configuration request including:
      country information describing a political region of the electronic device and regional restrictions associated with the political region;
      a static URL with an appended variable portion, wherein the static URL includes an address of the network resource and the appended variable portion includes application information, the application information including the political region of the electronic device;
   populating the application information into a template in accordance to the political region;
   determining a second URL based on the template, the second URL being associated with the content source from which the political region-specific content for the application can be obtained; and
   providing the second URL to the electronic device in response to the configuration request.

2. The computer program product recited in claim 1, wherein the application information includes information controlling features to be enabled or disabled in the application.

3. The computer program product recited in claim 1, wherein the application information includes system preferences.

4. The computer program product recited in claim 1, wherein the regional parameters include global positioning system information.

5. The computer program product recited in claim 4, wherein the application runs on a smartphone.

6. The computer program product recited in claim 1, wherein the application information includes a language preference for the application.

7. The computer program product recited in claim 1, wherein the computer program product resides in programmed logic of a configuration module.

8. The computer program product of claim 1, the application information further including an application version associated with the electronic device, the computer program further comprising computer instructions for populating the application information into a template in accordance to the application version.

9. A method of selecting a political region-specific content source for an application a plurality of potential content sources, comprising:
  receiving, at a network resource from an electronic device, a configuration request for a content source that contains content specific for an application on the electronic device, the configuration request including:
    country information describing a political region of the electronic device and regional restrictions associated with the political region;
    a static URL with an appended variable portion, wherein the static URL includes an address of the network resource and the appended variable portion includes application information, the application information including the political region of the electronic device;
  populating the application information into a template in accordance to the political region;
  determining a second URL based on the template, the second URL being associated with the political region-specific source from which the content for the application can be obtained; and
  providing the second URL to the electronic device in response to the configuration request.

10. The method of claim 9, wherein the application information includes information controlling features to be enabled or disabled in the application.

11. The method of claim 9, wherein the application information includes system preferences.

12. The method of claim 9, wherein the regional parameters include global positioning system information.

13. The method of claim 9, wherein the application runs on a smartphone.

14. The method of claim 9, wherein the application information includes a language preference for the application.

15. The method of claim 9, the application information further including an application version associated with the electronic device, the computer program further comprising computer instructions for populating the application information into a template in accordance to the application version.

16. A system, comprising:
  an electronic device containing an application;
  a plurality of content sources; and
  a network resource having a processor executing stored computer code configured to:
    receive, at a network resource from the electronic device, a configuration request for a political region-specific content source from the plurality of content sources that contains content specific for an application on the electronic device, the configuration request including:
      country information describing a political region of the electronic device and regional restrictions associated with the political region;
      a static URL with an appended variable portion, wherein the static URL includes an address of the network resource and the appended variable portion includes application information, the application information including the political region of the electronic device;
    populate the application information into a template in accordance to the political region;
    determine a second URL based on the template, the second URL being associated with the content source from which the political region-specific content for the application can be obtained; and
    provide the second URL to the electronic device in response to the configuration request.

17. The system recited in claim 16, wherein the application information includes information controlling features to be enabled or disabled in the application.

18. The system recited in claim 16 wherein the regional parameters include global positioning system information.

19. The system recited in claim 16, wherein the application information includes a language preference for the application.

20. The system of claim 16, the application information further including an application version associated with the electronic device, the computer program further comprising computer instructions for populating the application information into a template in accordance to the application version.

21. The system of claim 16, the application information further including a geographic location, the computer program further comprising computer instructions for populating the application information into a template in accordance to the geographic location.

* * * * *